3,222,220
WATER DISPERSIBLE HIGH AMYLOSE STARCH
Otto B. Wurzburg, Whitestone Station, and William Herbst, North Plainfield, N.J., assignors to National Starch and Chemical Corporation, New York, N.Y., a corporation of Delaware
No Drawing. Filed Feb. 7, 1963, Ser. No. 256,806
3 Claims. (Cl. 127—32)

This invention relates to a method for the preparation of non-retrograded, hot water dispersible high amylose starches and to the novel starch products thus produced.

The present application is a continuation-in-part of our application Serial No. 2604, filed January 15, 1960, now abandoned.

It is the object of this invention to convert high amylose starch, which is normally not dispersible in water at temperatures between 60° C. and about 100° C., to a state wherein it is dispersible in water at the aforesaid temperature.

It is a further object of this invention to provide a method for preparing high amylose starches in a form which permits the ready formation of aqueous dispersions which may be employed as adhesives, food products, paper and textile sizing agents, and in such other applications where stable, high strength starch films are required. An additional object of this invention is the preparation of strong, self supporting films from these high amylose starches.

It is known that starch consists of two fractions, the molecular arrangement of one being linear, and the other being branched. The linear fraction is known as amylose, and the branched fraction as amylopectin. Starches from the conventional sources (e.g., corn, tapioca, potato, etc.) contain no more than about 30% amylose, and usually ess. However, some starches have been genetically developed which contain 50% or more of amylose, and these "starches" begin to assume the properties of amylose rather than of starch. When we use the term "high amylose starch" in the specification and claims, we refer to whole starch which is composed of at least 50% amylose.

Because amylose is structurally different from starch, being devoid of the branched amylopectin molecules, it has a number of properties which are radically different from those of starch. Thus, ordinary starch may be dispersed in water ("gelatinized") by mere heating at atmospheric pressure at temperatures ranging from about 60–100° C. Gelatinization, in brief, involves the swelling and bursting of the heretofore intact starch granules and their disintegration in water so as to form a colloidal sol from which films may be easily cast. On the other hand, high amylose starch cannot be dispersed in this manner, since under normal conditions its granules do not swell sufficiently in water at ordinary cooking temperatures so as to yield dispersions capable of forming films. Therefore, in order to disperse it in water, in the absence of added chemicals, it is necessary to use much higher temperatures as well as super-atmospheric pressures. This indispersibility in hot water is a serious drawback.

It should be mentioned that whenever we speak of starch being "dispersed" or forming a "dispersion" or a "solution," we refer to the above-described phenomenon of gelatinization and formation of a colloidal sol. This is in contrast to the mere suspension of ungelatinized starch granules in water, from which they settle out, characteristic of "non-dispersible" or "insoluble" starches.

The problem therefore has been how to modify the high amylose starch so that the dry starch need merely be mixed with water and heated to temperatures in the order of between 60° C. and 100° C., resulting in the dispersion of the starch to form a colloidal sol. In other words, the problem has been how to make high amylose starch become as readily dispersible in hot water, at about 60°–100° C., as ordinary starch. A further problem has been how to achieve this hot water solubility without the necessity of chemical solubilizers (which might alter its properties undesirably). It is known that this cannot be achieved by heating the high-amylose starch in water at super-atmospheric pressures and high temperatures and then drum-drying, since heat increases the naturally intense retrogradation of the amylose and results in a dry product whose solubility in hot water has actually been decreased rather than increased.

We have now discovered a means for producing non-retrograded, dry high amylose starch which, unlike the untreated high amylose starch, can be dispersed by mere heating in water at about 60°–100° C. The thus treated starch is still non-dispersible in cold water (that is, water at room temperatures). For the first time, therefore, we have a high-amylose starch which can be dispersed with the ease of ordinary starch, namely, heating in water at about 60°–100° C. without the need for chemical treatment or super-atmospheric pressures. Aside from the ease of dispersion, our new high amylose starch product has not lost any of its other properties, which cause it to be so much more desirable than ordinary starch for many uses, and in fact some of these properties are improved.

Our new high amylose starch is made by subjecting dry high amylose starch to attrition grinding, preferably as a result of the shearing action of mechanical rolls.

In preparing the products of our invention, we have found that we can make use of any device which is capable of attrition grinding, preferably as the result of the shearing action of mechanical rollers. Examples of such suitable grinding devices are 2 and 3 roll rubber mills preferably of the differential roll type, and various types of paint pigment mills. Other attrition grinding devices which may be used incude ball mills and pebble mills.

The high amylose starch which may be subjected to this process has already been defined as any starch containing at least 50%, by weight of amylose. Also applicable to the process of our invention are derivatives, including esters and ethers as well as any other chemical modifications of high amylose starch. This high amylose starch or derivative thereof may be processed in the anhydrous form, or it may contain up to 35%, by weight, of moisture. We have, however, noted that optimum results are obtained by using high amylose starch having a moisture content of approximately 12%, the latter concentration being the moisture content of most commercially supplied starch. We have found that although some heat is developed in the attrition grinding step, the moisture content of the milled starch is not materially below that of the starch before treatment.

We have found that excellent aqueous dispersions are obtained with the products of our invention by adding the processed starch to the requisite amount of water and then heating the resulting mixture to a temperature of from 60° to 100° C. These dispersions, if allowed to set, produce gels which are considerably firmer than the gels derived from similar dispersions of unmodified high amylose starch. When films are cast from these dispersions of our high amylose starch products, the resulting films are notably clearer, more continuous, and less grainy than films obtained from dispersions of ordinary high amylose starch.

With respect to these film products, we have discovered that by mixing sorbitol with the high amylose starch prior to the attrition grinding operation, the resulting water dispersible products will then yield films which are far stronger than the films obtained from high amylose starch which has been milled without any sorbitol being present.

It is also important to note that the addition of sorbitol to high amylose starch which has already been subjected to the milling, i.e., attrition grinding, operation, results in water dispersible mixtures which yield films that are three to four times weaker than the films derived from mixtures wherein the sorbitol has been added prior to the milling operation.

Regarding proportions, we prefer to use 50% of sorbitol based on the weight of the high amylose starch; however, a complete range of from 10–75%, by weight, of sorbitol can be used depending upon the properties desired in the resulting films.

When sorbitol is to be employed, it is seen that it is critical that it be present during the attrition grinding of the high amylose starch. However, the attrition grinding of high amylose starch, without the use of sorbitol, is itself an important aspect of this invention.

As for the actual preparation of our water dispersible high starch products, we prefer to employ a 2-roll rubber mill; although, as we have previously indicated, any other devices capable of attrition grinding by means of the application of a shearing action through mechanical rollers as well as other types of grinding devices such as ball or pebble mills may also be used. In using the 2-roll rubber mill, the untreated high amylose starch, either with or without sorbitol, may be passed through its cooled rolls as many times as is found necessary in order to achieve a final product possessing the described properties. Upon emerging from the mill the starch product is in the form of a dry, non-retrograded, flaked sheet. This may then be conveniently reduced to any desired mesh size by the use of an appropriate comminuting device, as for example the Wiley Laboratory Mill.

The resulting starch products, which are not cold water dispersible but which disperse in hot water, may be used, without further treatment or modification, in such applications as the carrier component of two part corrugating adhesives. Our novel high amylose starches may also be utilized in the form of their aqueous dispersions, or pastes, for adhesives, food products, paper or textile sizing agents, reinforcing agents, etc.

In the case of the mixtures of sorbitol and high amylose starch, the resulting dispersions yield exceedingly strong films which are highly resistant to cracking and shrinkage. These films are non-toxic and may be used, for instance, as edible carriers for any number of pharmaceutical products such as vitamins and antibiotics.

The following examples will more clearly illustrate the embodiment of our invention. In these examples all parts given are by weight unless otherwise noted.

*Example I*

This example illustrates the preparation of hot-water dispersible high amylose cornstarch by means of the process of our invention.

In preparing this hot water dispersible high amylose starch, the procedure involved passing the starch which contained 55% of amylose and had a moisture content of 9%, through the cooled rolls of a 2-roll rubber mill. After two additional repetitions of this milling operation, the resulting non-retrograded, flaky, sheeted product was then ground through a 20 mesh screen using a Wiley Laboratory Mill.

The properties of the resulting material may be compared with a control comprising an unmilled sample of the same high amylose cornstarch.

Five grams of this milled sample and 5 grams of the control, which had been similarly ground through a 20 mesh screen, were each suspended with slight agitation, in individual graduated cylinders filled with 100 ml. of distilled water at a temperature of 25° C. Neither sample could be dispersed in the water at that temperature.

One part of each starch sample was then cooked, with agitation, in 10 parts of distilled water for a period of 20 minutes at a temperature of 60°–100° C. The milled product was observed to thicken in only 5 minutes while the control gave only a very slight degree of thickening after 15 minutes. Furthermore, upon cooling to 25° C. the milled sample set to a much firmer gel than was obtained with the control. Microscopic examination of the cooked pastes revealed that the roller milled product contained almost no intact starch granules while the control exhibited a very high proportion of unswollen starch granules.

Portions of each of the hot pastes were also poured on to steel plates coated with polytetrafluoroethylene whereupon 25 mil (wet) films were drawn with a Gardner adjustable film casting knife. These films were then dried for 12 hours at a temperature of 22° C. and a relative humidity of 40%. Upon later examination, the films derived from the control were found to be fragmented, and discontinuous. In contrast, the films derived from the milled high amylose starch product of our invention were intact, and continuous.

A more thorough investigation of the cooking characteristics of the two materials was conducted by means of the Brabender Viscograph. In using this device, the pH of the initial aqueous dispersions, containing 12 parts of the respective starch sample in 87 parts of water, were, in each case, adjusted to 7.5 by the addition of dilute aqueous alkali. The graphic data obtained with the Viscograph showed that the milled high amylose starch started to thicken much sooner than the control (25 vs. 41 minutes) and it also reached a peak viscosity in 40 minutes while the control never showed a true peak. In addition, when allowed to cool to 25° C., the milled sample set to a considerably more rigid, higher viscosity gel than was obtained with the control.

The pastes of our milled high amylose starch product were successfully employed in a number of different applications including paper bonding adhesives and sizing agents for textiles and paper.

From the results of the various tests described in this example, the many advantages inherent in our milled high amylose starches are immediately apparent.

*Example II*

This example illustrates the preparation of water dispersible products from a number of different high amylose starch derivatives.

The starch derivatives which were subjected to the process of our invention were:

(1) A tertiary alkyl amine ether of high amylose corn starch prepared by treating a high amylose corn starch, having an amylose content of 50%, with beta-diethyl amino ethyl chloride hydrochloride, as per Example I of U.S. Patent No. 2,813,093.

(2) A high amylose corn starch acetate ester prepared by treating a high amylose corn starch, having an amylose content of 55%, with an aqueous alkaline solution of acetic anhydride, as per Example I of U.S. Patent No. 2,461,139.

These derivatives all had a moisture content of 12%, by weight, and portions of each were, respectively, subjected to the attrition grinding process of our invention according to the procedure described in Example I hereof except that in this case the resulting non-retrograded, flaky, sheeted products were then ground through a 40 rather than a 20 mesh screen.

Five gram portions of each of these milled samples, as well as 5 gram control samples of unmilled portions of each derivative, which had been similarly ground through a 40 mesh screen, were each suspended, with slight agitation, in individual graduated cylinders filled with 100 ml. of distilled water which was at a temperature of 25° C.

None of the samples dispersed in water at the 25° C. temperature. When the samples were heated for 20 minutes at 85–90° C., the milled derivatives dispersed to form relatively clear sols, and the films cast from these sols were substantially clear and continuous. On the other hand, the unmilled samples, similarly cooked, dispersed to far lesser extent to form relatively opaque masses, whose cast films were discontinuous and grainy as compared to those cast from the milled samples.

*Example III*

This example illustrates the preparation of high strength films from dispersions derived from sorbitol-high amylose starch mixtures wherein the sorbitol had been added to the starch prior to the milling operation. The tensile strength of these films was then determined and compared with that of films prepared from dispersions of high amylose starch and sorbitol wherein the sorbitol had been added after the starch had already been milled.

One hundred parts of a sample of high amylose starch having an amylose content of 55% were admixed with 50 parts of sorbitol and passed through the cooled rolls of a 2-roll rubber mill. The resulting non-retrograded, flaky sheeted product was ground through a 40 mesh screen using a Wiley Laboratory Mill and then cooked for 20 minutes in 5 parts of water at a temperature of 88° C. Films were cast from this dispersion onto waxed, phenolic resin coated plywood boards and allowed to air dry for 16 hours at a relative humidity of 45°. The dried films, which were approximately 2 mils thick, were stripped from the plywood boards and cut into 0.5" x 6.0" strips. After being conditoned for 48 hours at a relative humidity of 60%, we then proceeded to determine the tensile strength of these films using an Instron Tensile Tester.

The following table presents the average results of these tensile strength tests and also provides the average tensile strength data obtained from similarly prepared films derived from sorbitol-high amylose starch dispersions wherein the sorbitol was added to the starch after the latter had already been milled.

| Material: | Average tensile strength of film (pound per square inch) |
|---|---|
| High amylose starch rubber milled with 50%, by wt., or sorbitol | 1,914 |
| Rubber milled high amylose starch to which 50%, by wt. of sorbitol was later added | 575 |

The above data indicates the criticality involved in combining the sorbitol with the high amylose starch prior to the milling operation.

Additional high strength films were prepared, according to the process of our invention, in which the concentration of sorbitol on the high amylose starch was, respectively, 25 and 75% by weight. All of these films displayed excellent resistance to shrinkage and cracking.

*Example IV*

This example provides a comparison between the dispersion properties of ordinary unmilled corn starch, a corn starch milled according to the process of U.S. Patent No. 2,464,081, an unmilled high amylose corn starch and a high amylose corn starch milled according to the process of our invention.

Five gram samples were prepared, comprising in one case ordinary unmilled corn starch; in another case a corn starch milled according to the process of Example 1 of U.S. Patent No. 2,464,081; in another case an unmilled high amylose corn starch containing 55% amylose; in the last case a high amylose corn starch containing 55% amylose and milled according to Example I of this specification. The moisture content of the starch in all cases was about 12%. Each sample was mixed with 100 ml. of water, at a temperature of 25° C. Even after 15 minutes agitation the unmilled corn starch, the unmilled high amylose starch and the milled high amylose starch had not dispersed to form a colloidal sol. On the other hand the sample of corn starch milled according to U.S. No. 2,464,081 had dispersed to some extent, forming a cloudy fluid.

Upon heating the above samples for 20 minutes at 85–90° C., the raw, unmilled, ordinary starch dispersed to form a relatively clear sol, as did the milled high amylose starch. The ordinary corn starch milled according to U.S. No. 2,464,081 had already been dispersed at the 25° temperature and now underwent little change. However, the unmilled high amylose starch remained undispersed.

This indicates that the milled high amylose starch of this invention, like ordinary starch, is not dispersible at room temperatures but does disperse to form a colloidal sol at about the same temperature that causes ordinary starch to do so.

Referring again to the process of U.S. Patent No. 2,464,081, wherein ordinary starch, such as corn starch, is passed through cooled differential rolls, it is seen that the case in that case is converted from one which originally could not be dispersed in cold water (but could be dispersed in hot water), to one which could be dispersed in cold water. Thus, the process of that patent accomplished, essentially, what had long been accomplished by drum drying. Drum drying of starch, of course, is the well known process whereby starch is mixed with water and passed over heated revolving drums, so that the starch is simultaneously dried and gelatinized. The thus treated starch is dispersible in cold water. We, on the other hand, are dealing with high amylose starch, which except for bearing the name "starch" is a very different substance from ordinary starch. High amylose starch could not be made into an aqueous slurry and drum dried to produce a product dispersible in either hot or cold water. Because of its properties of retrogradation, accelerated by heat, the high amylose starch is actually made less, rather than more, soluble by passing over heated drums.

Drum drying being ruled out, and not wishing to employ excessive heat, super-atmospheric pressures or solubilizing chemicals, the attrition grinding of this invention is the only means, to our knowledge, of treating dry high amylose starch, without the need for chemicals, to cause it to become dispersible in water at temperatures equivalent to those used for dispersing ordinary starch, namely approximately 60°–100° C. Unlike the product of the above-mentioned patent, our product is not dispersible in cold water, and cannot be made so even by repeated subjection to our attrition grinding process.

Variations in procedures, proportions and materials may be made without departing from the scope of this invention, which is limited only by the following claims.

We claim:

1. A dry non-retrograded high amylose starch which is indispersible in cold water and dispersible in hot water, comprising starch containing at least 50% of amylose by weight, admixed with from 10% to 75% of sorbitol by weight of the starch.

2. A self-supporting film of dry non-retrograded high amylose starch, said film being indispersible in cold water and dispersible in hot water and comprising starch containing at least 50% of amylose by weight, admixed with from 10% to 75% of sorbitol by weight of the starch.

3. The process of preparing dry, non-retrograded high amylose starches which are indispersible in cold water and dispersible in hot water, which comprises subjecting starches containing at least 50% of amylose by weight and admixed with from 10% to 75% of sorbitol by weight of the starch to the starch granule shearing action of attrition grinding.

References Cited by the Examiner

UNITED STATES PATENTS

| 2,464,081 | 3/1949 | Hansen et al. | 127—33 |
| 2,656,571 | 10/1953 | Davis et al. | 106—210 XR |

CHARLES B. PARKER, *Primary Examiner.*